Feb. 9, 1960
HIROSHI SUZUKAWA
2,924,160
CURTAIN SHUTTER WINDING MECHANISM FOR CAMERAS
Filed June 23, 1955
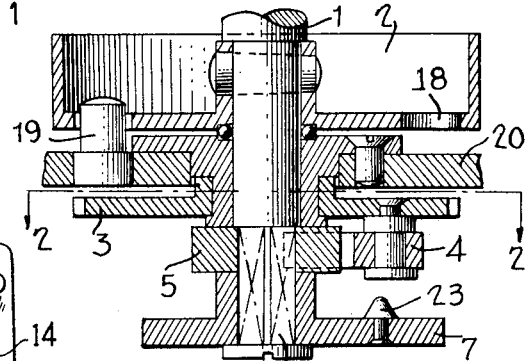
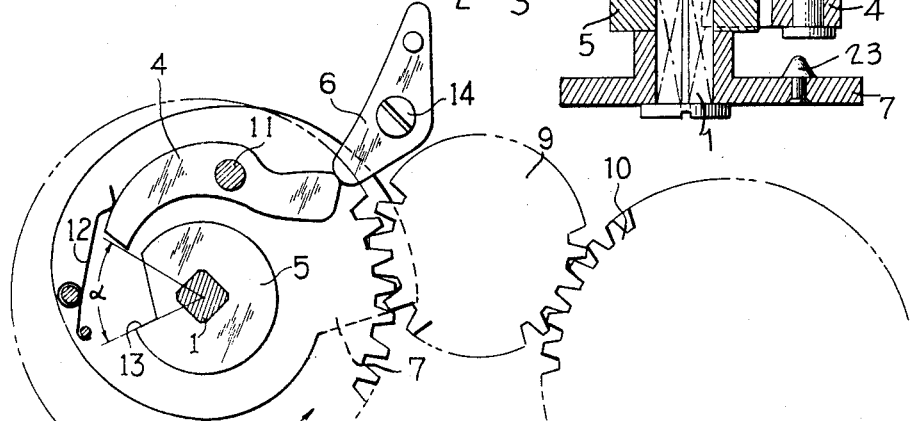
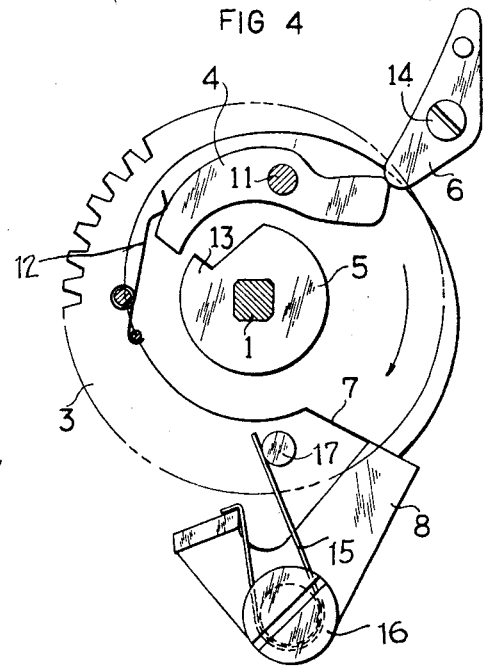
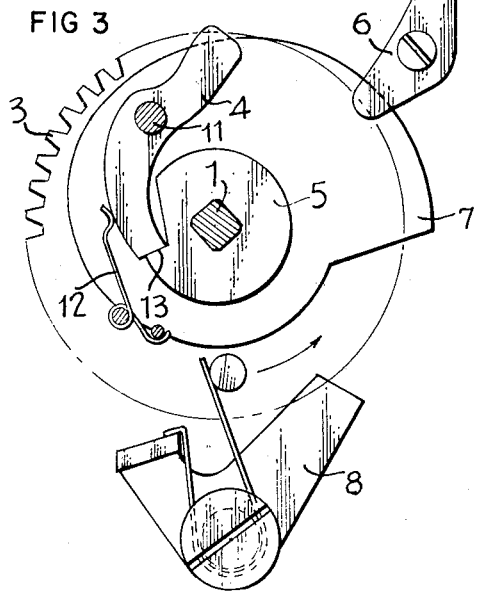
INVENTOR.
Hiroshi Suzukawa
BY
*Attorney*

2,924,160
CURTAIN SHUTTER WINDING MECHANISM FOR CAMERAS

Hiroshi Suzukawa, Tokyo, Japan, assignor to Canon Camera Company, Inc., Tokyo, Japan, a corporation of Japan Application June 23, 1955, Serial No. 517,617

Claims priority, application Japan July 6, 1954

5 Claims. (Cl. 95—57)

This invention relates to apparatus for focal plane shutters in which the shutter winding gear train has no direct relation with the exposure of the shutter and is separated from the winding shaft. According to this invention, the drum shaft for winding up the shutter is normally released from the gears transmitting rotation to it. Only during the winding-up operation is the shaft operatively connected to the gearing, and when the shutter winding operation is completed they automatically release from each other.

A clearer concept of the scope and purpose of this invention may be obtained from the following description, taken in connection with the attached drawing, in which:

Fig. 1 shows a longitudinal section of an embodiment of this invention; and

Fig. 2 to Fig. 4 inclusive, show simplified plan views below line 2—2 of Fig. 1, showing the operational status of the essential parts of the shaft and gear coupling and decoupling means before the shutter is wound up, at the start of the shutter winding, and after the shutter is wound up, respectively.

In the figures of the drawing, 1 designates the shaft of the shutter winding-up drum; 2 a drum for winding up the ribbon of the first curtain, and 3 a shutter winding-up gear coaxial with and rotatable about drum shaft 1. Pawl 4 is pivotable about pin 11 extending from the flat face of gear 3. Ratchet wheel 5 is fixed to shaft 1 and has a single holding step 13 with which pawl 4 is adapted to engage. Projection 6 is fixed to the body of the camera by screw 14 for the purpose of releasing pawl 4. Cam 7 having a shoulder is integral on drum shaft 1, while angular pawl 8 is pivoted on the camera body and adapted to engage the shoulder of cam 7. Intermediate gears 9 and 10 are operatively connected with gear 3 and the film advancing mechanism in prior known manner.

Fig. 2 shows the position of each member after the shutter is released. The free end of pivoted pawl 4 being engaged by projection 6, releases the ratchet wheel 5 so as to keep drum shaft 1 independent of the now released gear 3. When the film winding knob is rotated in the film winding direction, gear 3, as well as pawl 4 pivoted thereto by pin 11, will rotate in the direction of the arrow, as shown in Fig. 2, through the film winding-up mechanism by way of intermediate transmission gears 9 and 10, etc. When the film winding up motion starts, the free end of pawl 4 is instantly released from projection 6, spring 12 biasing its other end counter-clockwise as far as it will go. When gear 3 has rotated through the angle α, as shown in Fig. 3, such pawl's other end engages step 13 of holding ratchet wheel 5 so as to lock gear 3 with drum shaft 1, and subsequently the drum shaft rotates with gear 3 to wind up the shutter.

Just before gear 3 completes one revolution in the shutter winding direction, the free end of pawl 4, striking against the projection 6, is pressed radially inwardly an amount sufficient to pivot the pawl to disengage its other, and spring pressed, end from step 13 against the tension of spring 12. It will be noted that in the shutter winding operation the pivoted angular pawl 8, of which one end is braced by spring 15 about its pivot 16 on the camera body against another fixed pin 17 on a portion of the camera body, is deflectable out of the path of the cam 7 in the shutter winding direction. However, when projection 6 releases pawl 4, on completion of the shutter winding, the shoulder of the free end of pawl 8 is in the path of cam 7 to prevent unwinding rotation of the wound-up, and tensioned, shutter. Now when the shutter release button is depressed, the angular pawl 8 is moved out of the path of cam 7, disengaging its step. Drum shaft 1, released from operative connection with gear 3 since pawl 4 is disengaged from ratchet wheel step 13, rotates under the pull of the wind-down reels to unwind the shutter, that is, in the direction of the arrow of Figure 4. When shaft 1 has rotated to the position shown in Figure 2, the unwinding of the shutter curtain and its ribbons from the drum is completed, and rotation stops. As is well known in the prior art, the total rotation possible by the curtain shutter drum 2 is limited in both directions by an arcuate groove 18 in the drum base into which extends a fixed pin 19, attached to a portion 20 of the camera body.

Hence, as above described, in the mechanism of this invention the drum shaft for winding up the shutter is normally operatively disconnected from its transmission gears, and only on its winding-up operation is operatively connected therewith, which operative connection is simultaneously released with the completion of the winding up. To release the shutter, accordingly, it is quite sufficient to impart a very slight pressure to the release button by which the latching member, angular pawl 8, is released. Furthermore, since the load of the related members is not applied to the curtain shaft 1, the moment of inertia of the rotating elements when the shutter is released is very small, and, accordingly, but the slightest of shocks is imparted to the camera, thus making even more certain of sharp pictures by the relatively immovable camera at the moment of exposure. It should also be noted that a spring of considerably less power is sufficient to move or run the curtain shutter a good deal faster than the conventional shutter as another result of the small magnitude of the moment of inertia.

What I claim is:

1. A curtain shutter winding mechanism for focal plane shutter cameras comprising a rotatable shaft, a first curtain drum integral on the shaft, a wind-up gear rotatable about the shaft, means to rotate the gear in the curtain winding direction of the shaft, a ratchet wheel integral on the shaft, a pawl pivoted on the gear and spring pressed to have one end thereof engage into a step on the ratchet wheel only on rotation of the gear in the curtain winding direction of the shaft, a projection fixed to the camera body extending into the rotary path of the free end of the pawl at substantially the region of the path at which a single revolution of the shaft in the curtain winding direction is completed, the projection on engagement with the free end of the pawl disengaging the spring pressed end of the pawl from the ratchet wheel step to disconnect the gear from the shaft, means for rotating the shaft when disconnected from the gear in the curtain unwinding direction, a cam integral on the shaft and having a single nose with a rapidly receding linear face on the trailing side of the nose in the curtain winding direction of shaft rotation, and a spring biased angular lever engageable to the trailing and linear face of the cam on completion substantially of a single revolution of the shaft in the curtain winding direction and shortly after the projection has disengaged the pawl from the ratchet wheel and disconnected the gear from the shaft and the latter has started to rotate in the curtain unwinding direction, and disengageable from the trailing and linear face of the cam under the control of the shutter release mechanism.

2. A curtain shutter winding mechanism for focal plane shutter cameras comprising a rotatable shaft, a first curtain drum integral on the shaft, a gear rotatable about the shaft, means to rotate the gear in the curtain winding direction of the shaft, a ratchet wheel fixed to the shaft and having a single peripheral detent with one locking face, a pawl pivotally mounted on the gear adjacent to the ratchet, a spring biasing one end of the pawl into engagement with the periphery of the ratchet, a projection fixed to the camera body extending into the rotary path of the other end of the pawl when the spring-pressed pawl end is in the detent and in engagement with the locking face of the detent, the circumferential dimension of the pawl being such that with its said other end engaging the projection when the curtain is unwound completely from the drum its said one end trails the ratchet wheel locking face in the curtain winding direction by a predetermined angle, a cam integral with the shaft and having a single nose with a locking face substantially diametrically opposite to the locking face of the detent, and an angle lever pivoted to the camera body and spring biased to extend one arm thereof into the rotary path of the cam nose, the free end of the one arm of the angle lever being spaced from the cam locking face on completion of the shaft rotation in the curtain winding direction, the one arm of the angle lever engaging the cam locking face shortly after the projection has released the pawl from the locking face of the detent disconnecting the gear from the shaft to permit rotation of the shaft in the shutter unwinding direction, and being disengageable from the cam locking face under the control of the shutter release mechanism, whereby on actuation of the means to rotate the gear in the curtain winding direction from the position in which said other pawl end engages the projection, said one end of the pawl on rotation of the gear through the predetermined angle engages the locking face of the detent to rotate the shaft and cam in the curtain winding direction until said other end of the pawl engages the projection to release said one end of the pawl from the locking face of the detent so that the shaft is released from the gear and rotates in the curtain unwinding direction a short amount to engage the locking face of the cam to the said one arm of the angle lever and to position said one end of the pawl circumferentially just beyond the locking face of the detent to prevent engagement therebetween on the swinging of the one arm of the angle lever from the locking face of the cam and the completion of the rotation of the shaft in the curtain unwinding direction.

3. In a shutter winding mechanism for focal plane shutters of cameras, the combination of a rotatable shaft, a first curtain drum, a gear rotatable about the shaft, a shutter releasing cam having a holding surface, a hold ratchet, the cam and ratchet both being integral with the shaft, a spring biased pawl pivoted on the gear, a projection integral with the camera body and extending into the rotary path of the pawl and so positioned as to permit holding engagement between the ratchet and the pawl only in the curtain winding direction of rotation of the shaft, and a spring-biased lever pivoted on the camera body of which one arm is biased against the cam periphery normally and is engaged by the holding face of the cam on completion of the shutter winding operation until displaced therefrom under the control of the shutter release mechanism, the angle lever being circumferentially spaced from the projection somewhat less than the angle of rotation required completely to wind the curtain.

4. The combination according to claim 3 in which the hold ratchet has a single holding surface positioned substantially diametrically opposite the projection when the shaft has rotated to unwind the curtain completely, the pawl is completely disengaged from the ratchet holding surface on completion of the film winding up by engagement of the pawl with the projection, and the drum shaft on release of the pawl from the ratchet holding surface, of the angle lever from the cam holding surface and of the shutter to make an exposure, rotates under the tension of the wound curtain with the ratchet and cam only, whereby the moment of inertia of rotating parts when making an exposure is reduced.

5. The combination of claim 4 in which the projection is so positioned to disengage the pawl from the ratchet holding surface when the curtain is completely wound up that the shaft rotates in the curtain unwinding direction a limited extent to engage the cam holding surface to the angle lever arm, the cam holding surface on such complete curtain winding being positioned a distance in advance, in the curtain winding direction of shaft rotation, of the position occupied at such time by the angle lever arm.

References Cited in the file of this patent
UNITED STATES PATENTS

| | | |
|---|---|---|
| 2,140,446 | Mihalyi | Dec. 13, 1938 |
| 2,171,660 | Leitz et al. | Sept. 5, 1939 |
| 2,203,657 | Mihalyi | June 4, 1940 |
| 2,253,084 | Mihalyi | Aug. 19, 1941 |